(12) United States Patent
Sailors

(10) Patent No.: US 6,179,361 B1
(45) Date of Patent: Jan. 30, 2001

(54) PICK-UP TRUCK WITH MULTI-POSITION TAILGATE

(76) Inventor: Lyle Sailors, 19427 Forest Pl., Castro Valley, CA (US) 94546

( * ) Notice: Under 35 U.S.C. 154(b), the term of this patent shall be extended for 0 days.

(21) Appl. No.: 09/407,249

(22) Filed: Sep. 28, 1999

(51) Int. Cl.[7] ............... B60P 1/26; B60P 1/273; B62D 33/023; B62D 33/03; B62D 37/02
(52) U.S. Cl. ................. 296/50; 29/56; 29/57.1; 29/180.1; 29/180.5
(58) Field of Search .......... 296/50, 56, 180.1, 296/180.5, 57.1

(56) References Cited

U.S. PATENT DOCUMENTS

| | | | |
|---|---|---|---|
| 4,159,843 | | 7/1979 | Crossman ................. 296/1 |
| 4,475,759 | * | 10/1984 | Wine ....................... 296/50 |
| 4,585,265 | * | 4/1986 | Mader ...................... 296/56 |
| 4,813,735 | * | 3/1989 | Avitable ................. 296/180.1 |
| 4,863,213 | | 9/1989 | Deaver et al. ........... 296/180.1 |
| 4,867,499 | * | 9/1989 | Stephan et al. ............ 296/50 |
| 4,902,066 | * | 2/1990 | Norman ................. 296/180.1 |
| 5,076,636 | | 12/1991 | Buck et al. ............. 296/180.1 |
| 5,324,092 | * | 6/1994 | Burg ..................... 296/180.1 |
| 5,352,008 | * | 10/1994 | Denvir .................... 296/50 |
| 5,411,312 | * | 5/1995 | Stallings ............... 296/180.1 |
| 5,486,032 | * | 1/1996 | Reed et al. ............... 296/50 |
| 5,630,637 | * | 5/1997 | Sauri ..................... 296/56 |
| 5,688,020 | * | 11/1997 | Burg ..................... 296/180.1 |

* cited by examiner

Primary Examiner—D. Glenn Dayoan
Assistant Examiner—Greg Blankenship
(74) Attorney, Agent, or Firm—Goldstein & Canino

(57) ABSTRACT

A pick-up truck with multi-position tailgate including a tailgate is coupled with respect to an open outer end of the bed of the pick-up truck. The tailgate has a pair of protrusions extending outwardly from opposing ends thereof for removably engaging a pair of apertures of the open outer to facilitate a hinged coupling with the pick-up truck. The tailgate has a pair of tabs extending outwardly of the opposing ends. The pair of tabs each have an elongated bracket extending outwardly therefrom. A pair of side tracks are secured to the opposed side walls of the bed of the pick-up truck. The pair of side tracks slidably receive free ends of the elongated brackets of the tailgate whereby the tailgate can be moved into a raised orientation.

2 Claims, 2 Drawing Sheets

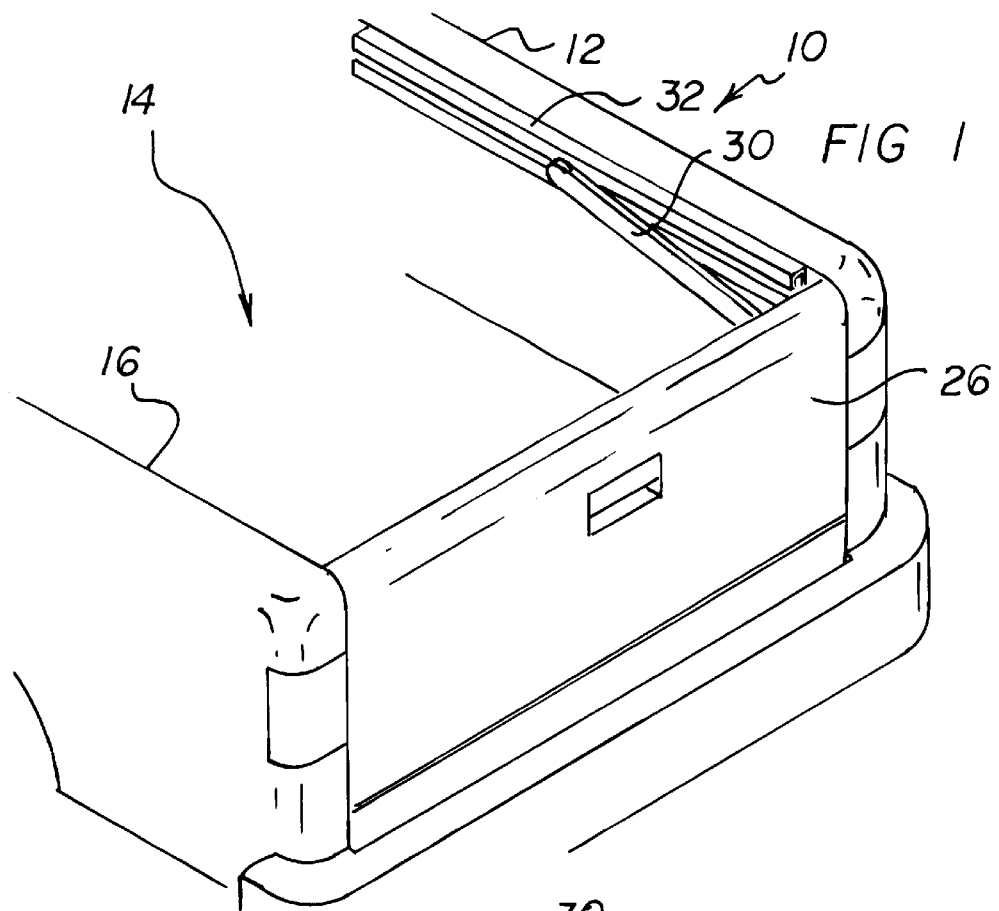
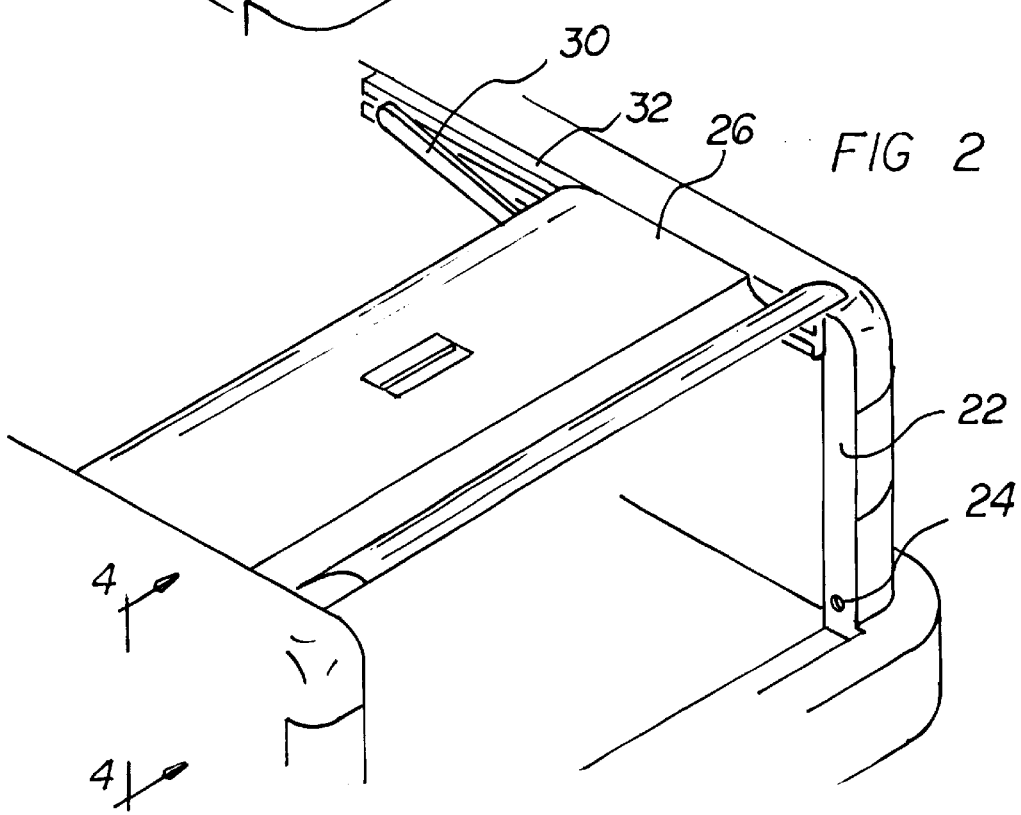

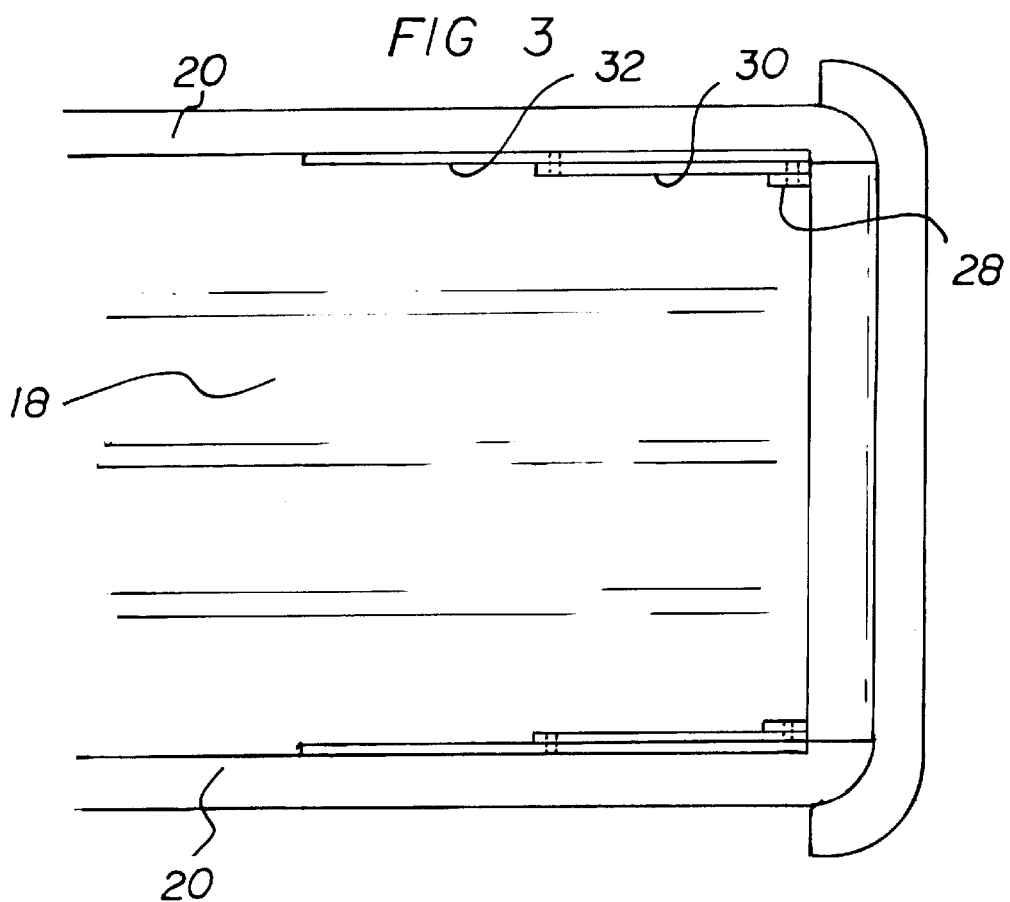
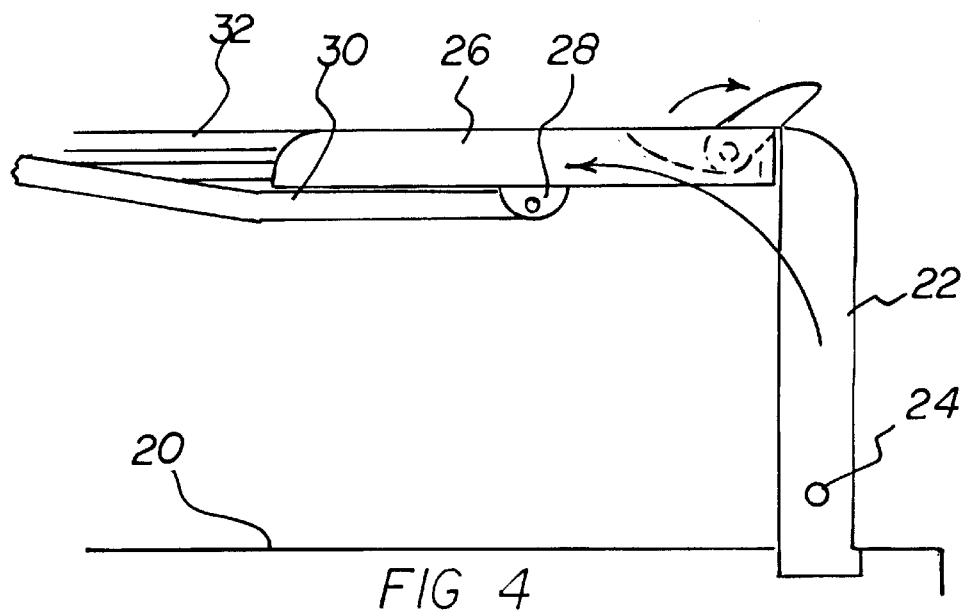

PICK-UP TRUCK WITH MULTI-POSITION TAILGATE

BACKGROUND OF THE INVENTION

The present invention relates to a pick-up truck with multi-position tailgate and more particularly pertains to a multi-position tailgate that allows better performance including air deflection.

The use of pick-up trucks is known in the prior art. More specifically, pick-up trucks heretofore devised and utilized for the purpose of hauling various items are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,863,213 to Deaver discloses a spoiler, attachable to the tailgate of a pickup truck to improve the aerodynamics of the vehicle and to protect the tailgate from damage. U.S. Pat. No. 5,076,636 to Buck discloses a spoiler attachable to the tailgate of a pickup truck for aerodynamic benefit. U.S. Pat. No. 4,159,843 to Crossman discloses a pickup truck air deflector fitted to the cab of the vehicle.

While these devices fulfill their respective, particular objective and requirements, the aforementioned patents do not describe a pick-up truck with multi-position tailgate for allowing for better performance including air deflection.

In this respect, the pick-up truck with multi-position tailgate according to the present invention substantially departs from the conventional concepts and designs of the prior art, and in doing so provides an apparatus primarily developed for the purpose of allowing for better performance including air deflection.

Therefore, it can be appreciated that there exists a continuing need for a new and improved pick-up truck with multi-position tailgate which can be used for allowing for better performance including air deflection. In this regard, the present invention substantially fulfills this need.

SUMMARY OF THE INVENTION

In the view of the foregoing disadvantages inherent in the known types of pick-up trucks now present in the prior art, the present invention provides an improved pick-up truck with multi-position tailgate. As such, the general purpose of the present invention, which will be described subsequently in greater detail, is to provide a new and improved pick-up truck with multi-position tailgate and method which has all the advantages of the prior art and none of the disadvantages.

To attain this, the present invention essentially comprises a pick-up truck having a rearwardly extending bed. The bed is defined by an open upper end, a closed lower end, opposed side walls, and an open outer end. The open outer end has a pair of apertures in opposing sides thereof. A tailgate is coupled with respect to the open outer end of the bed of the pick-up truck. The tailgate has a pair of protrusions extending outwardly from opposing ends thereof for removably engaging the pair of apertures of the open outer end to facilitate a hinged coupling with the pick-up truck. The tailgate has a pair of tabs extending outwardly of the opposing ends. The pair of tabs each have an elongated bracket extending outwardly therefrom. A pair of side tracks are secured to the opposed side walls of the bed of the pick-up truck. The pair of side tracks slidably receive free ends of the elongated brackets of the tailgate whereby the tailgate can be moved into a raised orientation. A spoiler is pivotally coupled with a lower end of the tailgate.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims the regarded as including such equivalent constructions insofar as they do not depart from the spirit and scope of the present invention.

It is therefore an object of the present invention to provide a new and improved pick-up truck with multi-position tailgate which has all the advantages of the prior art pick-up trucks and none of the disadvantages.

It is another object of the present invention to provide a new and improved pick-up truck with multi-position tailgate which may be easily and efficiently manufactured and marketed.

It is a further object of the present invention to provide a new and improved pick-up truck with multi-position tailgate which is of durable and reliable construction.

An even further object of the present invention is to provide a new and improved pick-up truck with multi-position tailgate which is susceptible of a low cost of manufacture with regard to both materials and labor, and which accordingly is then susceptible of low prices of sale to the consuming public, thereby making such a pick-up truck with multi-position tailgate economically available to the buying public.

Even still another object of the present invention is to provide a new and improved pick-up truck with multi-position tailgate for allowing for better performance including air deflection.

Lastly, it is an object of the present invention to provide a new and improved pick-up truck with multi-position tailgate including a tailgate coupled to an open outer end of the bed of the pick-up truck. The tailgate has a pair of protrusions extending outwardly from opposing ends thereof for removably engaging a pair of apertures of the open outer to facilitate a hinged coupling with the pick-up truck. The tailgate has a pair of tabs extending outwardly of the opposing ends. The pair of tabs each have an elongated bracket extending outwardly therefrom. A pair of side tracks are secured to the opposed side walls of the bed of the pick-up truck. The pair of side tracks slidably receive free ends of the elongated brackets of the tailgate whereby the tailgate can be moved into a raised orientation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the preferred embodiments of the invention as illustrated by the accompanying drawings and description.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the pick-up truck with multi-position tailgate constructed in accordance with the principles of the present invention.

FIG. 2 is a perspective view of the present invention illustrated in a raised orientation.

FIG. 3 is a plan view of the present invention illustrated in a lowered orientation.

FIG. 4 is a side view of the present invention illustrated in FIG. 2.

The same reference numerals refer to the same parts through the various figures.

DESCRIPTION OF THE PREFERRED EMBODIMENT

With reference now to the drawings, and in particular, to FIGS. 1 through 4 thereof, the preferred embodiment of the new and improved pick-up truck with multi-position tailgate embodying the principles and concepts of the present invention and generally designated by the reference number 10 will be described.

Specifically, it will be noted in the various Figures that the device relates to a pick-up truck with multi-position tailgate for allowing for better performance including air deflection. In its broadest context, the device consists of a pick-up truck, a tailgate, a pair of side tracks, and a spoiler. Such components are individually configured and correlated with respect to each other so as to attain the desired objective.

The pick-up truck 12 has a rearwardly extending bed 14. The bed 14 is defined by an open upper end 16, a closed lower end 18, opposed side walls 20, and an open outer end 22. The open outer end 22 has a pair of apertures 24 in opposing sides thereof. The pick-up truck 12, although shown only partially in the Figures, is designed similar to those known in the art.

The tailgate 26 is coupled with respect to the open outer end 22 of the bed 14 of the pick-up truck 12. The tailgate 26 has a pair of protrusions extending outwardly from opposing ends thereof for removably engaging the pair of apertures 24 of the open outer end 22 to facilitate a hinged coupling with the pick-up truck 12. Thus, the hinged coupling allows the tailgate 26 to be lowered so as to be on the same plane as the closed lower end 18 of the bed 14. Additionally, the tailgate 26 is provided with a locking mechanism that would allow the tailgate 26 to be fixedly engaged to the open outer end 22. The tailgate 26 has a pair of tabs 28 extending outwardly of the opposing ends. The pair of tabs 28 each have an elongated bracket 30 extending outwardly therefrom.

The pair of side tracks 32 are secured to the opposed side walls 20 of the bed 14 of the pick-up truck 12. The pair of side tracks 32 slidably receive free ends of the elongated brackets 30 of the tailgate 26 whereby the tailgate 26 can be moved into a raised orientation. Note FIGS. 2 and 4. To raise the tailgate 26, the protrusions would be disengaged from the apertures 24 and the user grasps the lower end of the tailgate 26 and raises upwardly whereby the elongated brackets 30 would slide with respect to the pair of tracks 32 to allow the tailgate 26 to be raised.

The spoiler 34 is pivotally coupled with a lower end of the tailgate 26. The spoiler 34 can be raised upwardly once the tailgate 26 is raised thereby providing proper air resistance. Note FIGS. 2 and 4. When the tailgate 26 is lowered, the spoiler 34 simply is directed downwardly. Note FIG. 1.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are: deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A pick-up truck with multi-position tailgate for allowing for better performance including air deflection comprising, in combination:

a pick-up truck having a rearwardly extending bed, the bed being defined by an open upper end, a closed lower end, opposed side walls, and an open outer end, the open outer end having a pair of apertures in opposing sides thereof;

a tailgate coupled with respect to the open outer end of the bed of the pick-up truck, the tailgate having a pair of protrusions extending outwardly from opposing ends thereof for removably engaging the pair of apertures of the open outer end to facilitate a hinged coupling with the pick-up truck, the tailgate having a pair of tabs extending outwardly of the opposing ends, the pair of tabs each having an elongated bracket extending outwardly therefrom;

a pair of side tracks secured to the opposed side wall of the bed of the pick-up truck, the pair of side tracks slidably receiving free ends of the elongated brackets of the tailgate whereby the tailgate can be moved into a raised orientation;

a spoiler pivotally coupled with a lower end of the tailgate.

2. A pick-up truck with multi-position tailgate for allowing for better performance including air deflection comprising, in combination:

a tailgate coupled with respect to an open outer end of a bed of the pick-up truck, the tailgate having a pair of protrusions extending outwardly from opposing ends thereof for removably engaging a pair of apertures of the open outer end to facilitate a hinged coupling with the pick-up truck, the tailgate having a pair of tabs extending outwardly of the opposing ends, the pair of tabs each having an elongated bracket extending outwardly therefrom;

a pair of side tracks secured to opposed side walls of the bed of the pick-up truck, the pair of side tracks slidably receiving free ends of the elongated brackets of the tailgate whereby the tailgate can be moved into a raised orientation;

and a spoiler pivotally coupled with a lower end of the tailgate.

* * * * *